United States Patent
Foitzik et al.

(10) Patent No.: US 9,765,763 B2
(45) Date of Patent: Sep. 19, 2017

(54) DEVICE FOR RECEIVING AND DISPENSING HYDRAULIC FLUID, IN PARTICULAR FOR A HYBRID OR ELECTRIC VEHICLE, AND BRAKING SYSTEM FOR A HYBRID OR ELECTRIC VEHICLE

(75) Inventors: Bertram Foitzik, Ilsfeld (DE); Willi Nagel, Remseck/Hochdorf (DE)

(73) Assignee: Robert Bosch GMBH, Stuttgart (DE)

( * ) Notice: Subject to any disclaimer, the term of this patent is extended or adjusted under 35 U.S.C. 154(b) by 588 days.

(21) Appl. No.: 13/991,236

(22) PCT Filed: Oct. 13, 2011

(86) PCT No.: PCT/EP2011/067881
§ 371 (c)(1),
(2), (4) Date: Aug. 14, 2013

(87) PCT Pub. No.: WO2012/072323
PCT Pub. Date: Jun. 7, 2012

(65) Prior Publication Data
US 2013/0333552 A1   Dec. 19, 2013

(30) Foreign Application Priority Data

Dec. 1, 2010   (DE) .......................... 10 2010 062 307

(51) Int. Cl.
*F04B 19/00* (2006.01)
*F15B 7/08* (2006.01)
(Continued)

(52) U.S. Cl.
CPC ............ *F04B 19/00* (2013.01); *B60L 3/0076* (2013.01); *B60L 7/18* (2013.01); *B60L 7/26* (2013.01);
(Continued)

(58) Field of Classification Search
CPC .. F16D 2127/10; F16D 65/18; F16D 2121/24; B60T 8/409; B60T 8/42; B60T 13/745
(Continued)

(56) References Cited

U.S. PATENT DOCUMENTS 3,374,628 A * 3/1968 Brooks ................... B60T 11/16
60/588
3,820,635 A * 6/1974 Hurt ........................ F16D 65/18
188/196 F
(Continued)

FOREIGN PATENT DOCUMENTS

CN          1598306         3/2005
DE     10 2007 030 441      1/2009
(Continued)

OTHER PUBLICATIONS

International Search Report, International Application No. PCT/EP2011/067881, dated Feb. 17, 2012.

*Primary Examiner* — Edelmira Bosques
*Assistant Examiner* — Richard Drake
(74) *Attorney, Agent, or Firm* — Norton Rose Fulbright US LLP; Gerard Messina (57) ABSTRACT

A device is described for receiving and dispensing hydraulic fluid, in particular for a hybrid or electric vehicle, having a cylinder, a piston, which is movable in the cylinder for receiving and dispensing hydraulic fluid, and a drive unit; a ramp mechanism being provided, having at least one ramp on which at least one rolling element rolls for moving the piston, the ramp mechanism being situated between a face of the piston and a face of a gearwheel driven by the drive unit.

31 Claims, 4 Drawing Sheets

(51) Int. Cl.
*B60L 3/00* (2006.01)
*B60L 7/18* (2006.01)
*B60L 7/26* (2006.01)
*B60L 11/14* (2006.01)
*B60T 1/10* (2006.01)
*B60T 13/58* (2006.01)
*B60W 50/16* (2012.01)
*B60W 30/18* (2012.01)

(52) U.S. Cl.
CPC .............. *B60L 11/14* (2013.01); *B60T 1/10* (2013.01); *B60T 13/586* (2013.01); *B60L 2240/12* (2013.01); *B60L 2240/421* (2013.01); *B60L 2250/26* (2013.01); *B60W 30/18127* (2013.01); *B60W 50/16* (2013.01); *Y02T 10/642* (2013.01); *Y02T 10/70* (2013.01); *Y02T 10/7077* (2013.01)

(58) Field of Classification Search
USPC ............. 188/72.8; 60/588; 476/37, 38, 156; 74/56
See application file for complete search history.

(56) References Cited

U.S. PATENT DOCUMENTS

| | | | | |
|---|---|---|---|---|
| 3,991,859 A * | 11/1976 | Coulter | ............... | F16D 65/18 188/106 F |
| 4,267,903 A * | 5/1981 | Kita | ............... | F16D 55/224 188/196 A |
| 6,374,958 B1 * | 4/2002 | Usui | ............... | B60T 13/741 188/156 |
| 8,006,814 B2 * | 8/2011 | Baier-Welt | ............... | F16D 65/18 188/72.7 |
| 9,501,063 B2 * | 11/2016 | Jiang | ............... | F16D 65/18 |
| 2003/0042084 A1 * | 3/2003 | Kawase | ............... | F16D 55/00 188/72.1 |
| 2008/0079309 A1 * | 4/2008 | Hatano | ............... | B60T 8/4081 303/113.5 |
| 2008/0179941 A1 * | 7/2008 | Matsushita | ............... | B60T 8/3275 303/20 |
| 2008/0185199 A1 * | 8/2008 | Kimura | ............... | B60K 6/445 180/242 |
| 2010/0243387 A1 * | 9/2010 | Vollert | ............... | F16D 65/56 188/156 |
| 2011/0241419 A1 | 10/2011 | Ohkubo et al. | | |

FOREIGN PATENT DOCUMENTS

| | | | | |
|---|---|---|---|---|
| DE | 102007055637 A1 * | 5/2009 | ............ | F16D 65/56 |
| GB | 2 240 146 | 7/1991 | | |
| JP | 2002-13568 | 1/2002 | | |
| JP | 2003-14015 | 1/2003 | | |
| JP | 2004-330966 | 11/2004 | | |
| JP | 2010-216650 | 9/2010 | | |

* cited by examiner

Fig. 4

DEVICE FOR RECEIVING AND DISPENSING HYDRAULIC FLUID, IN PARTICULAR FOR A HYBRID OR ELECTRIC VEHICLE, AND BRAKING SYSTEM FOR A HYBRID OR ELECTRIC VEHICLE

FIELD

The present invention relates to a device for receiving and dispensing hydraulic fluid, in particular for a hybrid or electric vehicle, and a braking system for a hybrid or electric vehicle.

BACKGROUND INFORMATION recuperative braking. For example, an electric drive motor of the vehicle is driven by a generator, the electrical energy thereby generated being fed into a storage device, in particular a battery, and then being retrievable as needed. The vehicle's power loss is reduced by recuperative braking, which is thus a suitable measure for reducing consumption and emissions.

Recuperative braking makes high demands on the cooperation of the components of the braking system which generate a friction-based braking torque, and components which generate a recuperative braking torque, because the recuperative braking torque depends on several factors: for example, a recuperative braking torque is not available when the battery is fully charged, so that the entire braking torque must be applied by friction-based braking. In addition, the recuperative braking torque depends on the rotational speed of the generator and thus on the speed of the vehicle, which is why it is not constant. For example, virtually no recuperative braking torque is available at low rotational speeds. Furthermore, even if recuperative braking is impossible, this must not result in a longer braking distance due to a component failure, for example.

Either the recuperative braking torque may be used in addition to the existing friction-based braking torque or the recuperative braking torque and the friction-based braking torque are controlled in such a way that their sum always corresponds to the driver's instantaneous braking intent. The latter approach is known as CRBS (cooperative regenerative braking system).

Various approaches are available for implementing CRBS in combination with pedal force simulators and power braking systems. These ensure complete or partial decoupling of the reactive forces acting on the driver via the brake pedal, which result from the pressure changes (brake pressure modulations) in the braking system associated with recuperation. In particular, however, in the case when CRBS is to be used in conjunction with traditional brake boosters, for example, a vacuum brake booster, it is much more difficult to control the pressure in the braking system, so that the driver does not perceive any reactions on the brake pedal during recuperative operation of the braking system. It may be a problem that reactions may make the driver feel insecure.

German Patent Application No. DE 10 2007 030 441 A1 describes a device having a cylinder, a piston which is movable in the cylinder for receiving and dispensing hydraulic fluid and a drive unit in the form of an electric motor. The electric motor is connected to the piston for movement of the latter with the aid of a threaded spindle. This device has the function of providing a constant pedal perception on the brake pedal to the driver of a hybrid or electric vehicle, regardless of whether or not recuperation is taking place.

SUMMARY

An example device in accordance with the present invention is comparatively compact and may therefore be made inexpensively. This is due to the fact that the ramp mechanism situated between the face of the piston and the face of the gearwheel is designed to be much shorter than the conventional threaded spindle. Furthermore, the ramp mechanism according to the present invention is much simpler to make in comparison with the threaded spindle.

The term "recuperation" as used herein refers to the recovery of kinetic energy of the vehicle in the form of electrical power during the braking of one wheel of the vehicle.

BRIEF DESCRIPTION OF THE DRAWINGS

Exemplary embodiments of the present invention are shown in the figures and explained in greater detail below.

DETAILED DESCRIPTION OF EXAMPLE EMBODIMENTS

The same reference numerals in the figures denote the same elements or elements having the same function, unless otherwise indicated.

Figure 1:
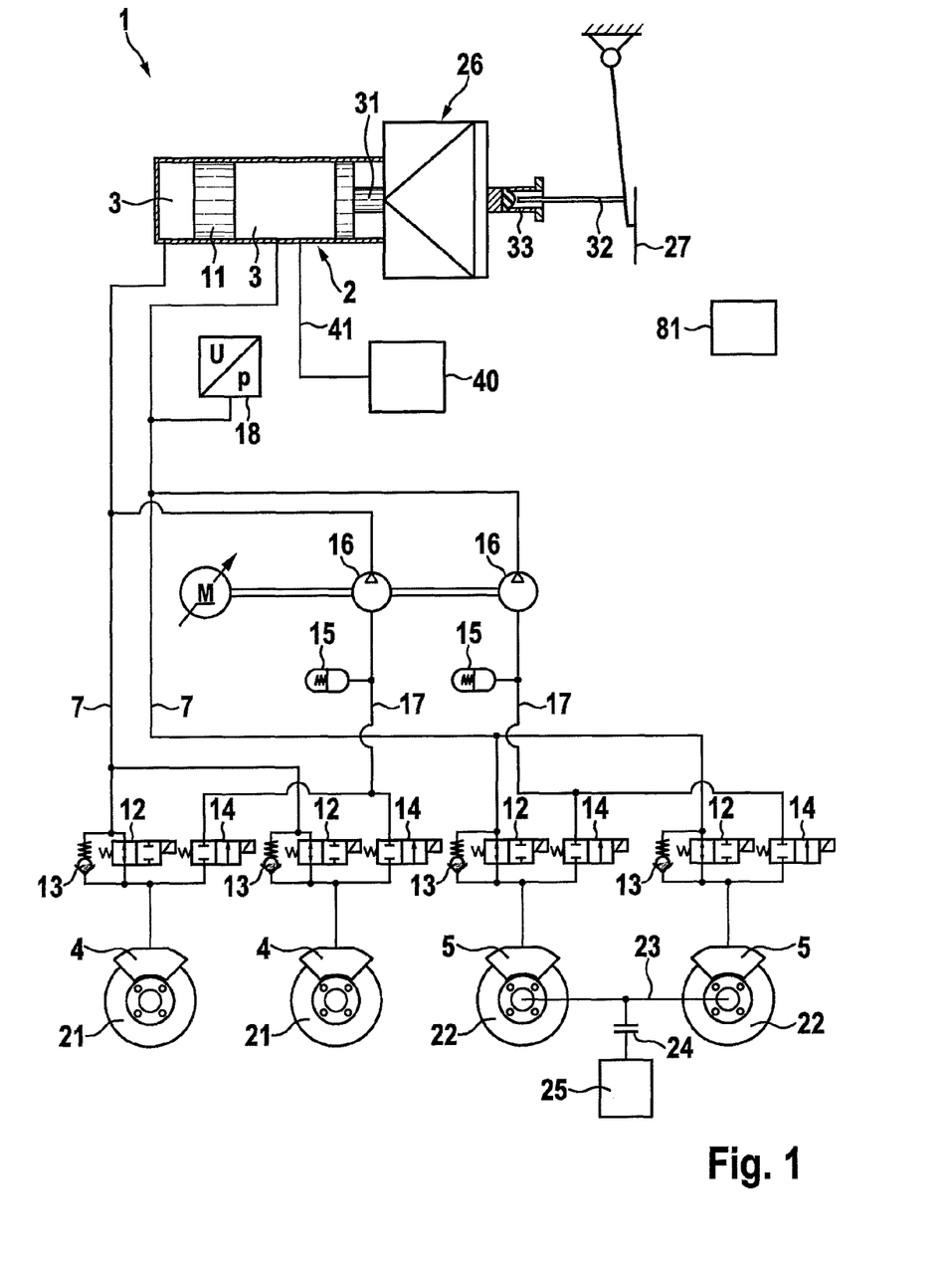
FIG. 1 schematically shows a braking system according to one exemplary embodiment of the present invention.

FIG. 1 schematically shows a braking system 1 according to one exemplary embodiment of the present invention.

Braking system 1, which is designed as an auxiliary braking system in particular, is preferably used in a hybrid or electric vehicle, which is not shown further here.

Braking system 1 has a master brake cylinder 2 having two chambers 3, each being hydraulically connected to two wheel brake cylinders 4, 5 with the aid of lines 7 for braking wheels 21 of the hybrid or electric vehicle. Master brake cylinder 2 is preferably a tandem master cylinder (TMC) having a floating piston 11. Each of lines 7 is connected with the aid of an intake valve 12 to a wheel brake cylinder 4, 5. Intake valves 12 may be designed as 2/2-way valves, which are currentless when open, as shown in FIG. 1. In addition, check valves 13 are provided in parallel with intake valves 12. Each of lines 7 may be designed to branch in order to supply hydraulic fluid to two wheel brake cylinders 4, 5.

Wheel brake cylinders 4 are also connected to a chamber 3 with the aid of outlet valves 14, a low-pressure storage device 15, a pump 16 and a line 17—the following statements refer only to the brake circuit shown at the left in FIG. 1 for the sake of a better understanding but also apply equally to the brake circuit shown at the right. Outlet valves 14 may be designed as 2/2-way valves, which are currentless when closed, as shown in FIG. 1. Pump 16 delivers hydraulic fluid into chamber 3 in an antilock mode of braking system 1. The pressure in chamber 3 is measured with the aid of a brake pressure sensor 18.

While wheel brake cylinders 4 are assigned to wheels 21 of a nondriven axle of the hybrid or electric vehicle, wheel brake cylinders 5 are provided for braking wheels 22 on a drive axle 23. Drive axle 23 is drivable by an internal combustion engine (not shown), for example. Drive axle 23 is connectable with the aid of a clutch 24 to a generator 25 of the hybrid or electric vehicle for charging a battery (not shown).

Braking system 1 also has a brake booster 26, which boosts a foot force applied by the driver of the hybrid or electric vehicle with the aid of a brake pedal 27 to a piston 31 of master brake cylinder 2. By activation of piston 31, the hydraulic fluid in chambers 3 is put under pressure. A pedal sensor 33 situated between pedal rod 32 and brake booster 26, for example, senses the pedal force applied by the driver and thus the driver's braking intent.

If pedal sensor 33 senses a driver's braking intent, a portion of the braking power may be applied by generator 25, which supplies the braking energy thereby generated as electrical power into the battery (not shown). Generator 25 is therefore coupled to drive axle 23 with the aid of clutch 24. However, the pressure of the hydraulic fluid applied to wheel brake cylinders 5 must then be reduced accordingly to maintain the braking power at a constant level on the whole.

For this purpose, braking system 1 has a device 40. Device 40 is hydraulically connected to one of chambers 3 with the aid of a line 41. This is a direct connection to chamber 3, i.e., without any intermediate cut-off valve. This is in contrast with the system described in German Patent Application No. DE 2007 030 441 A1.

Device 40 is used to receive hydraulic fluid from chamber 3 or to dispense it to the chamber.

Figure 2:
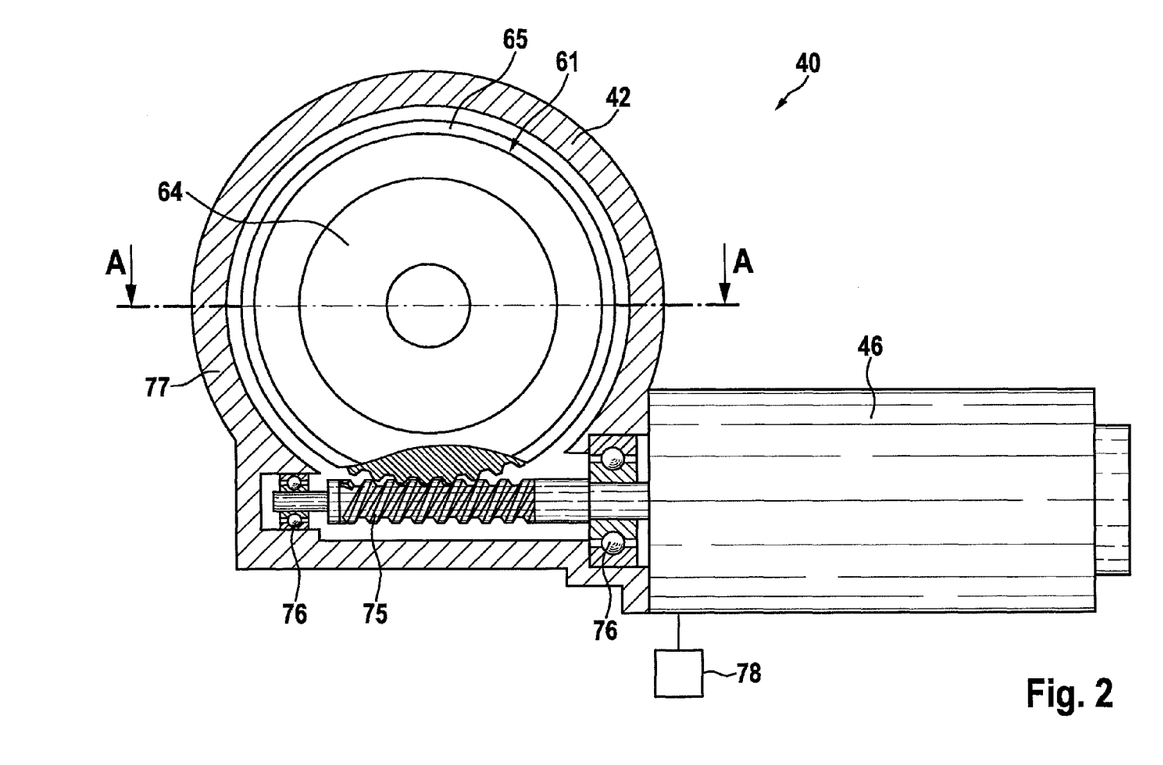
FIG. 2 shows a sectional view of the device according to one exemplary embodiment of the present invention.
Figure 3:
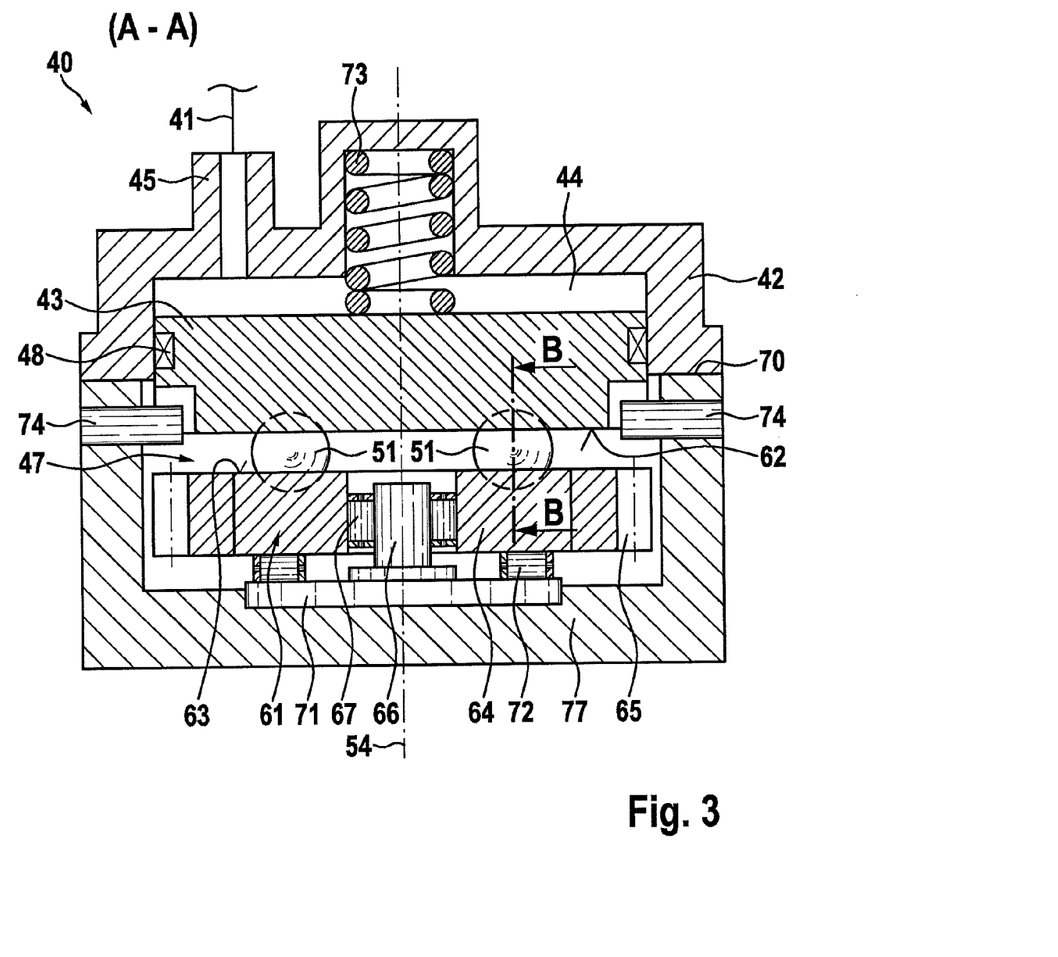
FIG. 3 shows a section A-A from FIG. 2.
Figure 4:
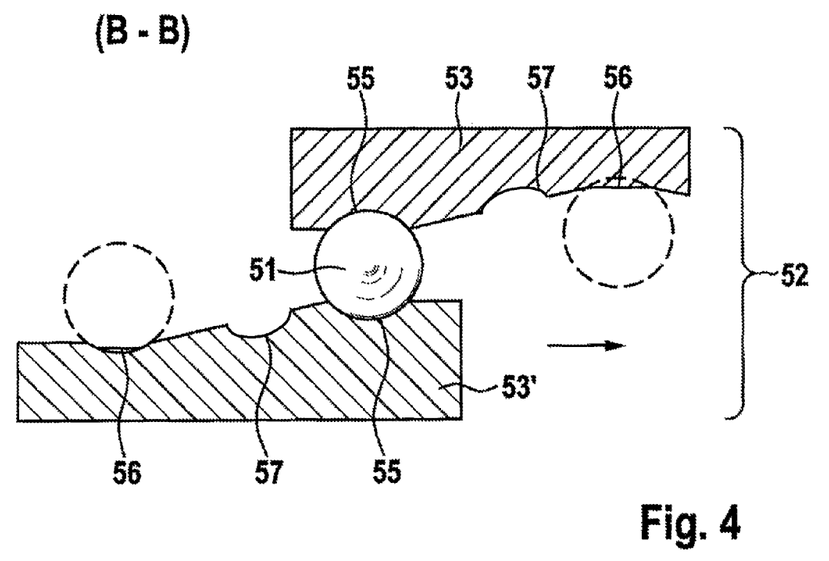
FIG. 4 shows a section B-B from FIG. 3.

Device 40 is explained in greater detail below on the basis of FIGS. 2 through 4; FIG. 2 shows a section through device 40; FIG. 3 shows a section A-A from FIG. 2; and FIG. 4 shows a section B-B from FIG. 3.

Device 40 has a cylinder 42 (see FIG. 3). A piston 43 for receiving and dispensing the hydraulic fluid is movably provided in cylinder 42. Piston 43 together with cylinder 42 forms a chamber 44 for receiving and dispensing hydraulic fluid as mentioned above. Chamber 44 is connected to line 41 with the aid of a connector 45 (see FIG. 1). Piston 43 is movable with the aid of a drive unit 46 (see FIG. 2), which is designed as an electric motor in particular. A piston seal of piston 43 is labeled as 48 in FIG. 3 and seals the gap between piston 43 and cylinder 42.

Device 40 also has a ramp mechanism 47. Ramp mechanism 47 preferably has three balls 51 (only two balls 51 are shown in the figures), each ball rolling between a pair 52 (see FIG. 4) of ramps 53, 53'. FIG. 4 shows only one such ramp pair 52 having one ball 51. However, three such configurations, as shown in FIG. 4, are preferably situated around central axis 54 of the piston (see FIG. 3). Three ramp pairs 52 are spaced 120 degrees apart in the circumferential direction around central axis 54 in relation to one another.

Alternatively, only two ramp pairs 52, each having one ball 51, could also be used. Two ramp pairs 52 would then be situated with a 180-degree offset from one another around central axis 54 of the piston. This would advantageously yield a larger pivot angle of ramps 53, 53' to one another, so that the stroke of piston 43 could again be increased.

Each of ramps 53 has two depressions 55 and 56. Depressions 55 are assigned to a first position of piston 43. This first position of the piston corresponds to a position in which cylinder 42 is completely emptied, i.e., the entire hydraulic fluid has been forced into chamber 3 of master cylinder 2 (see FIG. 1). Depressions 56 correspond to a position of ball 51, which is shown with a dashed line. In this position of ball 51, piston 43 is in a second position in which cylinder 42 is completely filled with hydraulic fluid.

Ramps 53 could also have a depression 57, which is merely indicated and is arranged between depressions 55 and 56. Depression 57 is usable for an expansion of the function of device 1 for compensation of an air gap in the case of "zero drag caliper," for example, i.e., when braking system 1 provides special wheel brake cylinders for a particularly low residual braking torque.

Ramp mechanism 47 is situated between a face 62 of piston 43 and a face 63 of a gearwheel 61 of device 1. Ramps 53 may be formed in one piece with face 62 of piston 43. In other words, ramps 53 may be formed from the same material, for example, in one piece with piston 43. Ramps 53 may just as easily be formed jointly or each formed as a separate part, fixedly connected to piston 43, for example, by screw connection. The same is true for ramps 53', which are situated on face 63 of gearwheel 61.

Gearwheel 61 preferably has a central disk element 64 surrounded by an annular gear 65, preferably made of plastic. Quiet running is achieved because annular gear 65 is preferably made of plastic. Annular gear 65 is preferably extruded onto disk element 64. This permits a simple manufacture of gearwheel 61. Alternatively, annular gear 65 may be made of metal, which is pressed onto disk element 64. Annular gear 65 preferably has an obliquely toothed spur gear.

Gearwheel 61 is preferably mounted radially on a journal 66 with respect to central axis 54 with the aid of rolling elements 67 and axially along central axis 54 with the aid of a contact face 71 and rolling elements 72. Contact face 71 is situated on a housing 77 connected to cylinder 42 via a separation point 70.

A spring 73 presses piston 43 against balls 51, gearwheel 61, rolling elements 72, contact face 71 and ultimately against housing 77, thereby ensuring that ramps 53, 53' are always in contact with balls 51.

In addition, an anti-twist mechanism 74 is provided, engaging in housing 77 on the one hand and in piston 43 on the other hand, to prevent twisting of piston 43 when it is activated with the aid of ramp mechanism 47.

Gearwheel 61 meshes with a worm gear 75 (see FIG. 2). Worm gear 75 is preferably made of metal and is mounted at its opposing ends with the aid of bearings 76 in housing 77. Housing 77 and cylinder 42 together form the space in which piston 43, gearwheel 61 and the aforementioned additional components of device 1 are situated.

Worm gear 75 is driven by electric motor 46. A rotor position sensor 78 (see FIG. 2) detects the position of the rotor of electric motor 46, from which the hydraulic fluid filling level of cylinder 42 may be inferred. Alternatively, the power input by electric motor 47 may also be used to determine the aforementioned filling level, because the power input varies when balls 51 each become engaged with one of depressions 55, 56 or roll along between ramps 53, 53'. Furthermore, depressions 55, 56, 57 are also easily detected using rotor position sensor 78.

The function and advantages of device 40 are explained in greater detail below.

Due to ramp mechanism 47, piston 43 may be designed with a comparatively large diameter. The operating stroke of piston 43, which is approximately 2 mm to 5 mm, for example, therefore drops again.

Use of ramp mechanism 47 in combination with gearwheel 61 and worm gear 75 results in a good efficiency of 80-90%, for example. In other words, approximately 80-90% of the work expended by electric motor 46 is applied to piston 43 and vice versa. The good efficiency entails the advantage of low power consumption of electric motor 46.

However, the good efficiency also means that if a high pressure prevails in chamber 44, this would result in an automatic adjustment of piston 43. Therefore, in addition to converting the rotational movement of gearwheel 64 into a stroke movement of piston 43, ramp mechanism 47 also has the function of preventing an automatic adjustment of piston 43 in certain positions of the same. For this purpose, ramps 53 of ramp mechanism 47 have depressions 55, 56, 57.

If ball 51 is in depression 55, for example, cylinder 42 is generally completely emptied. Piston 43 is in its first position (cf. FIG. 3). If the driver then makes an emergency stop in a condition in which braking system 1 is not recuperating, the pressure increases sharply in hydraulic line 41 and thus also in chamber 44. Depressions 55, causing this pressure rise or the high pressure, does not result in an automatic downward movement of piston 43 in FIG. 3, i.e., in such a way that the volume in chamber 44 is increased. Such an increase in the volume of chamber 44 would adversely reduce the brake pressure applied to wheel brake cylinders 4. Without depression 55, the total back pressure would have to be applied by electric motor 46, which would result in excessive energization of the same. Electric motor 46 may be disconnected with the aid of depressions 55 during non-recuperating operation of braking system 1.

Therefore, a disconnected cutoff valve, as described in the related art described above, is not needed in the present case, although device 40 has the good efficiency mentioned and need not be permanently energized.

Only if braking is performed with a recuperative component is electric motor 46 energized, so that balls 51 move out of depressions 55. Lower ramp 53' therefore rotates in the direction indicated by the arrow in FIG. 4 with respect to upper ramp 53, and return spring 73 presses piston 43 downward in FIG. 3, so that cylinder 42 receives hydraulic fluid through line 41. Electric motor 46 is triggered by a control device 81 (see FIG. 1), which is connected to pressure sensor 18 (see FIG. 1) and ensures that the pressure in chamber 3 remains constant when braking with recuperation, so that the driver does not notice any reactions at brake pedal 27 (brake pressure modulations) that would make him feel unsecure. Control device 81 controls electric motor 46 until the excess pressure and the excess hydraulic fluid in chamber 3 is dispensed to chamber 44 of device 40 with the aid of line 41. Control device 81 may readjust electric motor 46 continuously to keep the pressure in chamber 3 constant.

If lower ramp 53' is moved in the direction of the arrow in FIG. 4 until ball 51 engages with depression 56 (shown with dashed lines in FIG. 4), chamber 44 has a maximal volume. Electric motor 46 may also be disconnected in this second position of piston 43 due to the fact that automatic adjustment of ramps 53, 53' is thereafter prevented due to depressions 56 without any risk of piston 43 shifting further.

If ball 51 is situated between depression 55 and depression 57, it will engage with depression 57 in the event of failure of electric motor 46 and will not move toward depression 56. The fact that only a partial volume of hydraulic fluid from chamber 3 is received in device 40 prevents excessive lengthening of the brake pedal travel.

Although the present invention has been described on the basis of preferred exemplary embodiments in the present case, it is by no means limited to that, but instead may be modified in a variety of ways. The refinements and exemplary embodiments described for the example device according to the present invention are applicable accordingly for the example braking system according to the present invention and vice versa. Furthermore, it should be pointed out that "a(n)" or "one" in the present case does not preclude a plurality.

What is claimed is:

1. A device for receiving and dispensing hydraulic fluid for a hybrid or electric vehicle, comprising:
   a cylinder;
   a piston which is movable in the cylinder to receive and dispense the hydraulic fluid;
   a gearwheel;
   a drive unit; and
   at least one rolling element that rolls on at least one set of ramps between a first roller position and a second roller position, wherein:
   at least one first ramp of the at least one set of ramps is formed by an outer face of the piston;
   at least one second ramp of the at least one set of ramps is formed by or is connected to the gearwheel; and
   the device is arranged such that:
   the piston moves from a first piston position to a second piston position and the cylinder fills with the hydraulic fluid when the at least one rolling element rolls from the first roller position to the second roller position; and
   the piston moves from the second piston position to the first piston position and the hydraulic fluid is removed from the cylinder when the at least one rolling element rolls from the second roller position to the first roller position.

2. The device as recited in claim 1, wherein the at least one second ramp of the at least one set of ramps is designed in one piece with the gearwheel.

3. The device as recited in claim 1, wherein the at least one first ramp and the at least one second ramp form at least one pair of opposing ramps, with one ramp of the pair of ramps being connected to the gearwheel.

4. The device as recited in claim 3, wherein the at least one set of ramps includes at least two pairs of opposing ramps, the pairs being offset from one another by one of approximately 180 and approximately 120 degrees about a central axis of the piston.

5. The device as recited in claim 1, wherein the at least one first ramp has at least one depression for engaging with the at least one rolling element.

6. The device as recited in claim 5, wherein the at least one depression includes a first depression and a second depression, the first depression corresponding to the first piston position in which the cylinder is empty of the hydraulic fluid, and the second depression corresponding to the second piston position in which the cylinder is filled with the hydraulic fluid.

7. The device as recited in claim 1, wherein the gearwheel has a disk element made of metal and an annular gear made of plastic, the gearwheel being driven by the drive unit with the aid of a worm gear made of metal.

8. The device as recited in claim 1, wherein the drive unit is an electric motor and has a rotor position sensor to ascertain a filling level of the cylinder.

9. The device as recited in claim 1, wherein the at least one rolling element is situated between the at least one first ramp formed on the face of the piston and the gearwheel.

10. The device as recited in claim 6, wherein a spring is engaged with a second face of the piston, and wherein a force exerted by the spring ensures that the at least one ramp formed by the face of the piston is in constant contact with the at least one rolling element.

11. The device as recited in claim 6, wherein the gearwheel is rotatably driven by the drive unit.

12. The device as recited in claim 11, wherein the piston is displaceable in a first direction toward the gearwheel by a rotation of the gearwheel that moves the at least one rolling element into the second depression.

13. The device as recited in claim 12, wherein, when the piston is displaced in the first direction, the cylinder receives the hydraulic fluid.

14. The device as recited in claim 12, wherein the piston is displaceable in a second direction away from the gearwheel by a rotation of the gearwheel that moves the at least one rolling element into the first depression.

15. The device as recited in claim 14, wherein, when the piston is displaced in the second direction, the cylinder dispenses the hydraulic fluid.

16. The device as recited in claim 15, wherein, when the piston is displaced in the first direction, the cylinder receives the hydraulic fluid.

17. The device as recited in claim 11, wherein the piston is displaceable in a direction away from the gearwheel by a rotation of the gearwheel that moves the at least one rolling element into the first depression.

18. The device as recited in claim 8, wherein the cylinder is directly connected by a hydraulic line to one of two chambers in a master brake cylinder.

19. The device as recited in claim 18, wherein the electric motor controls the rolling of the at least one rolling element according to data provided from the rotor position sensor and a pressure sensor connected to the one of two chambers.

20. A braking system for a hybrid or electric vehicle, the braking system including:
a first device for receiving and dispensing hydraulic fluid, the first device including:
a cylinder;
a piston which is movable in the cylinder to receive and dispense the hydraulic fluid;
a gearwheel;
a drive unit; and
at least one rolling element that rolls on at least one set of ramps between a first roller position and a second roller position for moving the piston; and
a second device for receiving and dispensing the hydraulic fluid and that:
includes a cylinder and a piston that is movable in the cylinder;
does not include any rolling elements; and
is hydraulically connected to the first device;
wherein:
at least one ramp of the at least one set of ramps is formed by or is connected to the gearwheel; and
the first device is arranged such that:
the piston of the first device moves from a first piston position to a second piston position and the cylinder of the first device fills with the hydraulic fluid when the at least one rolling element rolls from the first roller position to the second roller position; and
the piston of the first device moves from the second piston position to the first piston position and the hydraulic fluid is removed from the cylinder of the first device when the at least one rolling element rolls from the second roller position to the first roller position.

21. The braking system as recited in claim 20, wherein:
the second device is a master brake cylinder and includes in the cylinder of the master brake cylinder a chamber, which is hydraulically connected to a wheel brake cylinder assigned to an axle of the vehicle to brake a wheel of the vehicle, the axle being connectable to a generator for generating electrical power for recuperation; and
the first device is directly hydraulically connected to the chamber of the second device to receive hydraulic fluid from the chamber or to dispense it to the chamber of the second device.

22. A device for receiving and dispensing hydraulic fluid for a hybrid or electric vehicle, the device comprising:
a cylinder;
a piston which is movable in the cylinder to receive and dispense the hydraulic fluid;
at least one rolling element; and
an electric motor that is activated to roll the at least one rolling element on at least one set of ramps only when the hybrid or electric vehicle is driving in a recuperation mode.

23. The device as recited in claim 22, further comprising:
a rotor position sensor; and
a pressure sensor;
wherein:
the cylinder is connected by a hydraulic line to a chamber in a master brake cylinder; and
the device is configured to:
determine a level to which the cylinder is filled with the hydraulic fluid using the rotor position sensor;
determine a pressure in the chamber using the pressure sensor; and
operate the electric motor in the recuperation mode to control a position of the at least one rolling element on the at least one set of ramps based on the determined level and pressure.

24. The device as recited in claim 22, wherein, for each of the at least one set of ramps, one of the ramps of the respective set is formed by an outer face of the piston.

25. The device as recited in claim 22, wherein, when the hybrid or electric vehicle is not driving in the recuperation mode, the at least one rolling element is prevented from rolling on the at least one set of ramps by a depression in the at least one set of ramps.

26. The device as recited in claim 22, wherein, when the hybrid or electric vehicle is not driving in the recuperation mode, the at least one rolling element prevents the piston from engaging in a movement that would allow the cylinder to receive the hydraulic fluid.

27. The device as recited in claim 22, wherein the rolling of the at least one rolling element on the at least one set of ramps shifts a position of the piston in the cylinder for the receiving and dispensing of the hydraulic fluid.

28. The device as recited in claim 22, wherein the cylinder is directly connected by a hydraulic line to one of two chambers in a master brake cylinder.

29. The device as recited in claim 28, wherein the electric motor controls the rolling of the at least one rolling element according to data provided from a rotor position sensor and a pressure sensor connected to the one of two chambers.

30. A device for receiving and dispensing hydraulic fluid for a hybrid or electric vehicle, the device comprising:
a cylinder;
a piston which is movable in the cylinder to receive and dispense the hydraulic fluid;
a drive unit; and
at least one rolling element that rolls on at least one set of ramps between a first roller position and a second roller position, wherein:

at least one ramp of the at least one set of ramps is formed by an outer face of the piston;

the device is arranged such that:
the piston moves from a first piston position to a second piston position and the cylinder fills with the hydraulic fluid when the at least one rolling element rolls from the first roller position to the second roller position; and the piston moves from the second piston position to the first piston position and the hydraulic fluid is removed from the cylinder when the at least one rolling element rolls from the second roller position to the first roller position;

at least one ramp of the at least one set of ramps includes a first depression, a second depression, and a third depression for engaging with the at least one rolling element;

the first depression corresponds to the first piston position in which the cylinder is empty of the hydraulic fluid;

the second depression corresponds to the second piston position in which the cylinder is filled with the hydraulic fluid; and the third depression corresponds to a third piston position that is between the first and second piston positions, the cylinder being partially filled with the hydraulic fluid when the piston is in the third piston position.

31. The device as recited in claim 30, wherein the piston is not displaceable when the at least one rolling element is in the third depression on the at least one ramp.

* * * * *